United States Patent [19]

Lyssy

[11] 3,897,532

[45] July 29, 1975

[54] METHOD OF MANUFACTURING THIN-WALLED HOLLOW ARTICLES OF POLYTETRAFLUORETHYLENE, APPARATUS FOR PERFORMING THE METHOD AND ARTICLES MANUFACTURED BY THE METHOD

[75] Inventor: Georges H. Lyssy, Zollikon, Switzerland

[73] Assignee: S & T Steiger Engineering AG, Zurich, Switzerland

[22] Filed: Sept. 17, 1973

[21] Appl. No.: 398,078

[30] Foreign Application Priority Data

Sept. 18, 1972  Switzerland...................... 13632/72

[52] U.S. Cl. ................ 264/127; 285/179; 425/412
[51] Int. Cl. ......................... B29c 3/00; F16l 43/00
[58] Field of Search ..................... 264/127; 425/412

[56] References Cited
UNITED STATES PATENTS

| | | | |
|---|---|---|---|
| 3,235,637 | 2/1966 | Hoffman et al..................... | 264/127 |
| 3,312,764 | 4/1967 | Trimble .............................. | 264/127 |
| 3,391,221 | 7/1968 | Gore et al.......................... | 264/127 |
| 3,424,830 | 1/1969 | Sfondrini et al. .................. | 264/127 |
| 3,635,624 | 1/1972 | Nakakoshi et al. ................ | 264/127 |
| 3,737,276 | 6/1973 | Hill et al. ........................... | 425/412 |

*Primary Examiner*—Donald E. Czaja
*Assistant Examiner*—H. H. Fletcher
*Attorney, Agent, or Firm*—Brisebois & Kruger

[57] ABSTRACT

A method of manufacturing thin-walled hollow articles of polytetrafluorethylene (PTFE) is described, comprising feeding PTFE powder into the interstice formed between the elastic matrices of a mold and a rigid core floatingly supported within said matrices, applying pressure onto the matrices and compressing the powder within the interstice, while preventing the lateral expansion of the matrices, releasing the pressure and withdrawing the article from the mold. The method is economical even when small lots are to be manufactured.

The apparatus for performing the method comprises feeding means, for feeding powder into an elastic mold, mold means comprising one or more matrices of rubber or of a rubber-like material, a mold cavity provided in or between the matrices, and a rigid core, simple or composite, elastically suspended within the cavity, bracing means for confining the matrices and for preventing their lateral expansion, and means for applying pressure onto the matrix or the matrices.

The articles manufactured by the method comprise thin-walled hollow articles, straight or curved and having relatively complex shapes, as for example elbow-shaped fittings, T-shaped fittings, reducing fittings, or multi-branch fittings, of polytetrafluorethylene or of other suitable material.

5 Claims, 4 Drawing Figures

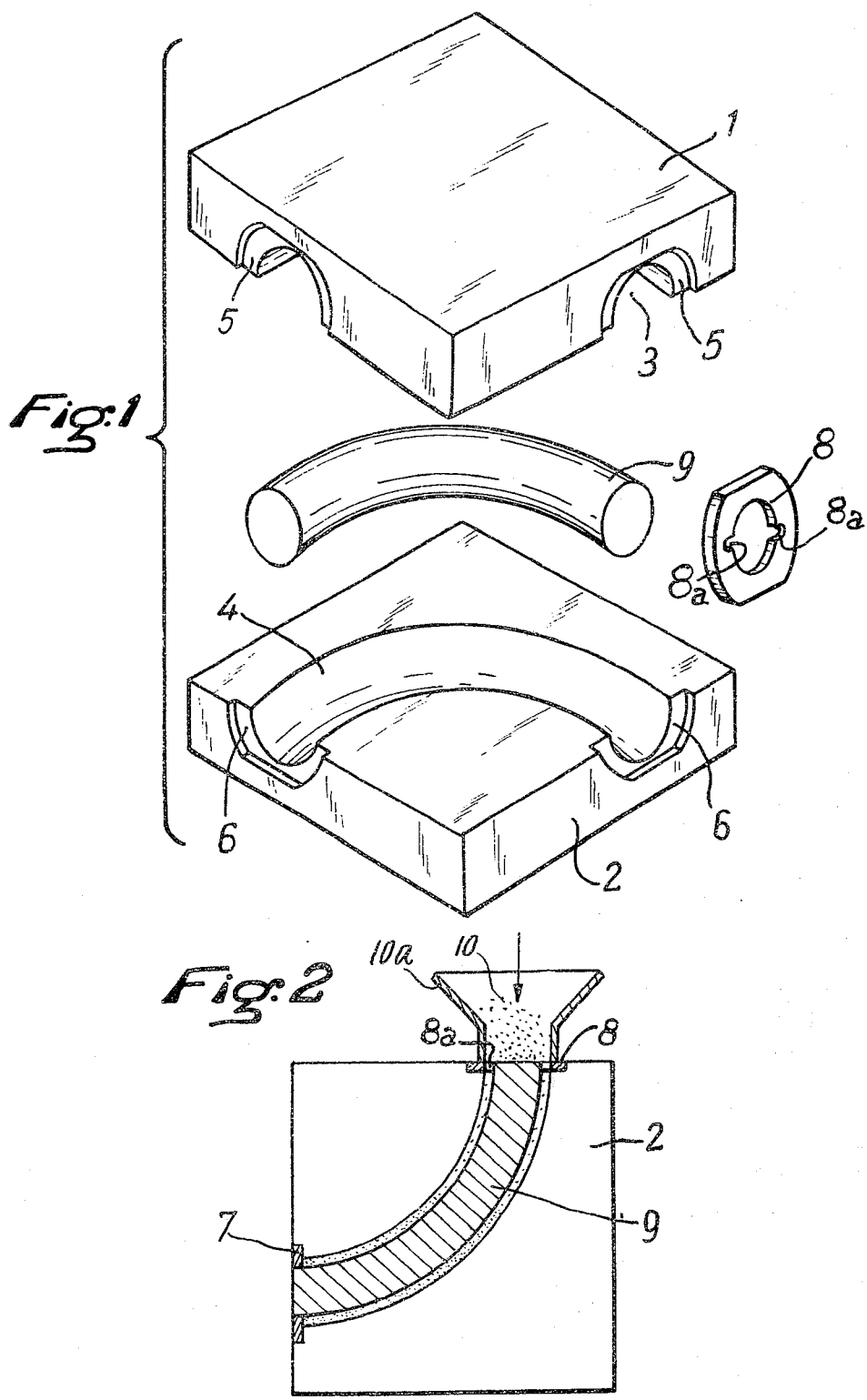

METHOD OF MANUFACTURING THIN-WALLED HOLLOW ARTICLES OF POLYTETRAFLUORETHYLENE, APPARATUS FOR PERFORMING THE METHOD AND ARTICLES MANUFACTURED BY THE METHOD

FIELD OF THE INVENTION

The invention relates to a method of manufacturing thin-walled hollow articles of polytetrafluorethylene powder, and more particularly to a compression molding method for manufacturing thin-walled hollow articles, straight or curved, and having relatively complex shapes.

The invention also relates to an apparatus for performing the method, and to the hollow thin-walled articles manufactured by the method.

BACKGROUND OF THE INVENTION

It is known to manufacture thin-walled hollow articles of PTFE, for example pipe fittings of relatively complicated shapes, by the dry or wet isostatic molding method, the molded article being heated or baked afterwards, to effect its solidification. These molding methods, which consist of pressing PTFE powder against a male or female matrix by means of a thin elastic membrane deformed by hydraulic pressure, supply articles of good quality. However, they show the disadvantage of being slow and complicated, and especially that they require, in one case, large diameter molds able to resist internal pressures higher than 300 kg/cm$^2$, and molds extremely expensive in the other case, the economy of thes methods being adversely affected by the fact that the articles are usually produced in small quantities.

OBJECTS OF THE INVENTION

It is thus a main object of the invention to provide a novel method of manufacturing good quality hollow articles with very thin walls and relatively complex shapes, the method being suited to provide said hollow articles economically, even when small lots are manufactured.

It is a further object of the invention to provide an apparatus for performing the method of the invention, said apparatus to be simple in its design, easy and economical in its construction and operation.

It is a further object of the invention to provide good quality thin-walled hollow articles of complex shapes, not hitherto obtainable by existing molding methods.

SUMMARY OF THE INVENTION

The invention aims at providing a method of manufacturing thin-walled hollow articles of PTFE free of the above-mentioned disadvantages, while surprisingly supplying articles of excellent quality, having wall thicknesses ranging from 1/10 to 1/100 of their internal diameter, and lying preferably between 1/25 and 1/75 of said diameter. The invention equally aims at providing an apparatus for performing the above-mentioned method, said apparatus consisting mainly of a mold which is easy and economical to build.

The invention has as its object a method of manufacturing thin-walled hollow articles of polytetrafluorethylene, wherein PTFE powder is introduced into an interstice of a mold comprising in conjunction with said interstice and surrounding a rigid core, at least one female matrix but preferably two female matrices of an elastic material, as for example of rubber or of a material with an elasticity and consistency analogous to that of rubber, said matrices providing support for that core, a pressure acting in a single direction is applied onto said matrices while their peripheral expansion is prevented, and the molded article is withdrawn from the mold, subsequent to which it may be subjected to the customary thermal treatments.

The compression is performed in such a way, that before the compression step the thickness of the interstice initially filled with powder is 2 to 2.5 times greater than the thickness of the hollow article obtained after completion of the compression step.

The molding pressure lies preferably between 150 and 300 kg/cm$^2$. The application of pressure is preferably carried out slowly, to permit the escape of the air contained in the powder. Similarly, the pressure is released at a slow rate, to account for the reduced elasticity of the molded article when compared to the elasticity of the mold matrices.

The method according to the invention differs from the known methods of molding PTFE powder, as for example from the method described in the French Pat. No. 1.504.807, in which the powder is compressed inside a rigid cylinder in which there is provided an elastic mass which deforms during the compression process. With these methods it is of course possible to produce thin-walled hollow articles of simple shapes, by compressing an elastic core inside a coaxial cylinder, but it is not possible to produce articles having more complex shapes, as for example curved fittings, T-shaped fittings, or multi-branch fittings.

On the other hand, the method according to the invention allows the manufacture of articles having very complex shapes, subject to the simple condition that they admit rigid removable cores.

Surprisingly enough, the method of the invention yields an article of good quality, especially in the case of articles with large dimensions and very small thicknesses, said good quality being seemingly due to the fact that the rigid core is supported directly by the elastomeric matrices, a fact which results in a floating assembly capable of adjusting to the various deformations which arise.

The invention also concerns an apparatus for performing the described method, comprising a mold provided in conjunction with said interstice and surrounding a rigid core, with at least one but preferably two female matrices of an elastic material, as for example of rubber, of an elastomeric material, or of a material having a consistency and an elasticity similar to that of rubber, said matrices which provide direct support for the core at predetermined locations, being contained inside a bracing frame having parallel side walls, means being provided to apply pressure onto the matrices inside the frame, in a single direction perpendicular to the base surfaces of the frame.

In a preferred embodiment, the rigid core is held in place inside the matrix cavities by means of rigid rings (washers) disposed at the ends of the core. These rings may be formed of ring-halves provided with orifices or passages permitting the introduction of the PTFE powder into the cavity, i.e., into the interstice surrounding the core.

The elastic material of the matrices is preferably of a Shore A harness comprised between 30 and 90, e.g.

in the order of 50. This material could be, for example, a plastic material of polyvinyl-chloride or a natural or synthetic rubber.

In general, if it is desired to manufacture articles having extremely thin walls, for example, having a thickness in the order of a few hundredths of the diameter of the hollow article, a harder material is used, its hardness being of the order of Shore A 60 or more. On the other hand, if it is desired to produce articles having somewhat thicker walls, of the order of 1/10 of their diameter, a softer rubber is used of a Shore A hardness of between 30 and 40.

The thickness of the elastic matrix, at each of its sections is preferably at least equal to half of the diameter of the hollow article to be produced.

Lastly, the invention concerns thin-walled hollow articles of PTFE produced by the method of the invention.

DESCRIPTION OF THE DRAWING

In the drawing:

FIG. 1 is an exploded view of a mold according to the invention, without the bracing frame;

FIG. 2 is a sectional view through the contact plane of the matrices during the filling process;

SPECIFIC DESCRIPTION

Figure 3:
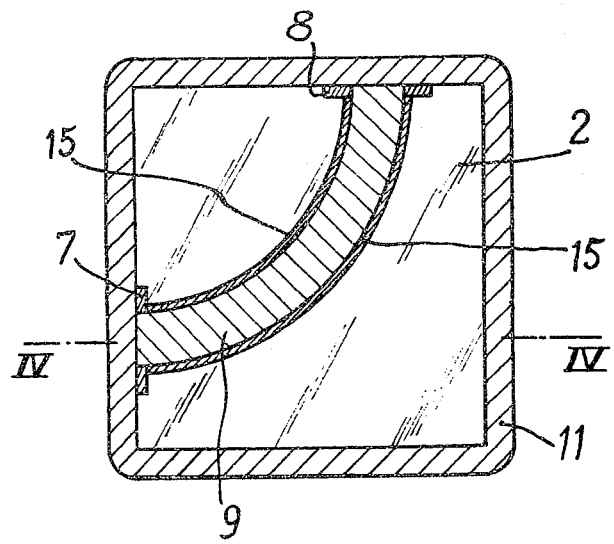
FIG. 3 is a sectional view through the contact plane of the matrices, at the end of the compression step.

The apparatus according to the invention comprises mainly a mold with two matrices 1 and 2 made of polyvinylchloride (PVC) plastic having elastic properties and a Shore A hardness of 75. These matrices shaped about as square plates, comprise the cavity halves 3 and 4 complementary to one another, which, when joined together form the mold cavity proper. The thickness of each of the two matrices is always greater than the diameter of the cavity, so that each of the matrices 1 and 2 possesses at its thinnest section a thickness larger than half of the diameter of the cavity. The cavity has a curved shape permitting the molding of an elbow-shaped tubular fitting. At the ends of the two cavity halves 3 and 4 there are provided the counterbores 5 and 6, destined to receive the rings 7 and 8.

These rings 7 and 8 make it possible to hold fixed inside the cavity a curved rigid core 9, for example of metal, destined to determine the internal shape of the elbow-shaped fitting to be molded. The core 9 is shown as made of a single piece. However, it could also consist of several disassemblable pieces, the complexity of which would correspond to that of the article to be molded.

In order to fill the mold with PTFE powder, subsequent to having assembled the matrices 1 and 2 around the core 9 supported by its rings, the powder is manually poured into the interstice between the core and the female cavity, through one end of the cavity, e.g. by way of a funnel 10a, the mold having been previously positioned to permit the complete filling of the cavity by the force of gravity. As shown in FIG. 2, the ring 8 comprises orifices or passages permitting the filling.

After completed filling, the two assembled matrices are placed inside a steel frame 11 having the shape of a square cylinder, the inside contour of which fits exactly around the matrices 1,2. The frame holding the matrices is then placed on top of the lower table of a press 12, and a metal plate 13 destined to act as a piston driven downwards by the upper plate 14 of the press, is placed on top of the upper surface of the matrix 1.

Figure 4:
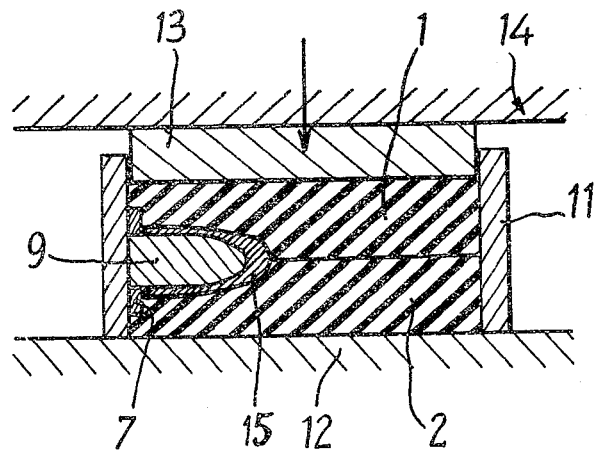
FIG. 4 is a section through the plane IV—IV of FIG. 3.

Pressure is then applied onto the mold in the direction of the arrow shown in FIG. 4, the rate of increase of the pressure being slow enough to permit the escape of the air present in the cavity. During the compression the thickness of the interstice decreases, the powder being progressively compressed at a very uniform rate, thanks to the interaction between the deforming elastic material and the rigid core maintained, as it were, floating inside the elastic matrices. The final thickness of the compressed interstice is 2 to 2.5 times smaller than its initial thickness in its non-compressed state. At the end of the compression, as shown in FIGS. 3 and 4, the elastic material of the matrices 1 and 2 has completed the compression of the powder 10 and formed a thin-walled curved article 15 of PTFE.

After slowly releasing the pressure, the assembly of matrices 1,2 is removed from the frame 11, the matrices are pulled apart, and the curved fitting 15, which still holds the rigid core 9 in it, is made free. The core 9 is finally removed and the fitting 15 made ready to be subjected to the subsequent customary heat-treatment at a temperature raised to approximately 350°C.

An elbow-shaped fitting was produced as an example, having an internal diameter (diameter of the core) of 50mm, an external final diameter of 57mm, the initial diameter of the cavity being 64mm. The applied maximum pressure was 150 kg/cm$^2$.

Tubular hollow elbows were produced as a second example, having an internal diameter of 20mm and a wall thickness of 2mm; elbows having an internal diameter of 50mm and a wall thickness of 2mm; elbows having an internal diameter of 200mm and a wall thickness between 3 and 4mm; and elbows having an internal diameter of 400mm and a wall thickness of 4mm.

The method according to the invention has also proved to be suited for molding thin-walled hollow articles of complex shapes, as for example T-shaped fittings, reducing fittings, etc., supplying at critical locations (zones where perpendicular branches are to be connected by T-fittings, zones of sharp curvature, etc.) a solution of a quality not surpassed even by the best of isostatic molding methods.

It is understood that although the invention has been described with reference to the manufacture of elbow-shaped fittings of PTFE, it may be used as well for the manufacture of segments of straight cylindrical tubing, provided that the core and the female cavity are straight. It is understood, furthermore, that the invention is in no way limited to the embodiment described, and that numerous modifications regarding shapes and materials may be brought to it, without departing from its scope or spirit.

What is claimed is:

1. A method of manufacturing thin-walled hollow articles of polytetrafluoroethylene, which method comprises the steps of:

locating a rigid core within a mold comprising at least one female matrix made of a compressible elastic material while spacing the core from the inner walls of the mold by foraminous means by a predetermined distance, introducing polytetrafluorethylene powder into said mold through said foraminous means to form a mass bearing against both the core and the inner wall of said matrix which substantially fills the space between said core and matrix, compressing said compressible matrix inwardly by applying pressure thereto in a single direction while preventing peripheral expansion thereof, until said powder is formed into a predetermined article, releasing said pressure, and removing said article from said mold.

2. The method claimed in claim 1 in which said compression is continued until the thickness of the space between said mold and said core is reduced to between one-half and two-fifths of its original thickness.

3. The method claimed in claim 1 wherein the the increase and decrease in pressure are carried out at a slow rate.

4. The method claimed in one of the claim 1 wherein a pressure of a magnitude between 150 and 350 kg/cm$^2$ is developed.

5. The method claimed in claim 1, wherein polytetrafluoroethylene powder is introduced into the mold by way of a funnel.

* * * * *